US 6,666,027 B1

(12) United States Patent
Cardenas, Jr.

(10) Patent No.: US 6,666,027 B1
(45) Date of Patent: Dec. 23, 2003

(54) TURBINE POWER GENERATION SYSTEMS AND METHODS USING OFF-GAS FUELS

(75) Inventor: Manuel M. Cardenas, Jr., Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/064,448

(22) Filed: Jul. 15, 2002

(51) Int. Cl.$^7$ ................................................. F02C 3/22
(52) U.S. Cl. ........................ 60/772; 60/39.465; 60/736
(58) Field of Search .................. 60/39.465, 39.511, 60/736, 772, 776

(56) References Cited

U.S. PATENT DOCUMENTS

| | | | |
|---|---|---|---|
| 3,107,482 A | * 10/1963 | Fono | ................... 60/772 |
| 4,754,607 A | 7/1988 | Mackay | |
| 5,274,996 A | 1/1994 | Goff et al. | |
| 5,345,756 A | * 9/1994 | Jahnke et al. | ................ 60/772 |
| 5,799,484 A | 9/1998 | Nims | |
| 6,032,459 A | 3/2000 | Skowronski | |
| 6,064,122 A | 5/2000 | McConnell | |
| 6,066,898 A | 5/2000 | Jensen | |
| 6,082,095 A | * 7/2000 | Akimaru | ................ 60/39.465 |
| 6,147,414 A | 11/2000 | McConnell et al. | |
| 6,169,332 B1 | 1/2001 | Taylor et al. | |
| 6,198,174 B1 | 3/2001 | Nims et al. | |
| 6,246,138 B1 | 6/2001 | Nims | |
| 6,281,595 B1 | 8/2001 | Sinha et al. | |
| 6,294,842 B1 | 9/2001 | Skowronski | |
| 6,318,066 B1 | 11/2001 | Skowronski | |
| 6,401,459 B1 | * 6/2002 | Tiras | ..................... 60/772 |

FOREIGN PATENT DOCUMENTS

WO    01/63175    8/2001

OTHER PUBLICATIONS

Advanced Microturbine Systems: Program Plan for Fiscal Years 2000 through 2006 U.S. Dept. of Energy; Office of Energy Efficiency and Renewable Energy; and Office of Power Technologies.

The Environmental Technology Verification Program: Southern Research Institute: SRI/USEPA–VS–GHG–10Sep. 2001.

* cited by examiner

Primary Examiner—Louis J. Casaregola
(74) Attorney, Agent, or Firm—Sutherland Asbill & Brennan LLP

(57) ABSTRACT

A turbine power generation system is provided for use with an off-gas fuel source. The system comprises first compression means for compressing air; second compression means for compressing off-gas; combustion means for combusting a mixture of said compressed air and a fuel comprising said off-gas; turbine means for converting energy released from combustion into mechanical energy; transduction means for converting the mechanical energy into electrical energy; a shaft linking the first compression means, turbine means, and transduction means, to allow mechanical energy produced by the turbine means to be used by the transduction means and first compression means; and an off-gas heating means for heating the compressed off-gas to a temperature greater than the gas dew point of the off-gas to ensure that no liquids are formed in the fuel gas supply to the combustor.

14 Claims, 5 Drawing Sheets

TURBINE POWER GENERATION SYSTEMS AND METHODS USING OFF-GAS FUELS

CROSS-REFERENCE TO RELATED APPLICATIONS

Not applicable.

FEDERAL RESEARCH STATEMENT

[Federal Research Statement Paragraph]Not applicable.

BACKGROUND OF INVENTION

This invention is generally in the field of turbine power generation systems utilizing off-gas fuels. Combustion turbines are often part of a power generation unit. The components of such power generation systems usually comprise the turbine, a compressor, and a generator. These components are mechanically linked, often employing multiple shafts to increase the unit's efficiency. The generator is generally a separate shaft driven machine. Depending on the size and output of the combustion turbine, a gearbox is sometimes used to couple the generator with the combustion turbine's shaft output. Combustion turbines are sometimes recuperated.

Microturbines are relatively small, multi-fuel, modular, distributed power generation units having multiple applications, such as disclosed in U.S. Pat. No. 4,754,607. Microturbines are a recently developed technology for use in such applications as, without limitation, auxiliary power units, on-site generators, and automotive power plants. Microturbines are normally of single-shaft design and generally use a single stage, radial type compressor and/or turbine with an internal generator directly coupled to the turbine shaft. Microturbines offer the capability to produce electricity remotely, without the necessity of an expensive infrastructure to deliver power to end users, thus providing electricity to remote locations at a lower cost per kilowatt than is available from a traditional centralized power plant with its necessary infrastructure of transmission lines.

Generally, microturbines and combustion turbines operate in what is known as a Brayton Cycle. The Brayton cycle encompasses four main processes: compression, combustion, expansion, and heat rejection. Air is drawn into the compressor, where it is both heated and compressed. The air then exits the compressor and enters the combustor, where fuel is added to the air and the mixture is ignited, thus creating additional heat. The resultant high-temperature, high-pressure gases exit the combustor and enter the turbine, where the heated, pressurized gases pass through the vanes of the turbine, turning the turbine wheel and rotating the turbine shaft. As the generator is coupled to the same shaft, it converts the rotational energy of the turbine shaft into usable electrical energy. In a single-shaft microturbine, the turbine, the compressor, and the generator share the single shaft, with the components commonly configured with the turbine at one end of the shaft, the compressor in the middle, and the generator at the opposite end of the shaft.

These microturbine power generation systems can be used to recover energy from off-gas sources. High BTU off-gas is frequently generated as a by-product of processing at oil and gas fields, and low to medium BTU off-gas can be generated from a variety of sources, such as landfills, wastewater treatment facilities, and digesters. Often the cost of recovery and transportation offsite of off-gases would not be economical viable, and the off-gases are simply flared or released into the atmosphere, and the potential energy of the off-gas is lost. Microturbine power generation systems, however, can be used to recover the energy from these high-BTU or low- to medium-BTU off-gases.

Using these off-gases as a fuel source for microturbine systems can, however, be problematic. In particular, the off-gases often contain condensable components that form liquids during the compression process. These liquids can foul the fuel valve assembly and combustor, leading to poorer system performance and deterioration of fuel and combustion system hardware. In cold climates, the liquid can actually freeze and cause the fuel lines to become blocked, restricting the flow of fuel and inhibiting the microturbine from receiving adequate fuel to operate.

Off-gases also typically have impurities that can foul and corrode the microturbine. For example, a high-BTU off-gas may contain $H_2S$, which can condense and form sulfuric acid, while a low-BTU off-gas may contain CO or $CO_2$ that can condense as carbonic acid. These acids are corrosive to process equipment in contact with the off-gas, and can increase the maintenance cost and/or shorten the useful operating life of the microturbine power generation system. It would therefore be desirable to provide a system and method for ensuring that no liquids are formed in the fuel gas supply to the combustor of a microturbine or other turbine power generation system. These means desirably would be adaptable to a variety of ambient conditions at the operating site of the turbine power generation system.

SUMMARY OF INVENTION

A turbine power generation system is provided for use with an off-gas fuel source, which comprises a first compression means for compressing air; a second compression means for compressing off-gas; a combustion means, such as a catalytic combustor, for combusting a mixture of said compressed air and a fuel comprising said off-gas; a turbine means for converting energy released from said combustion into mechanical energy; transduction means for converting the mechanical energy produced by said turbine means into electrical energy; a shaft linking said first compression means, said turbine means, and said transduction means, to allow mechanical energy produced by said turbine means to be utilized by said transduction means and said first compression means; and an off-gas heating means for heating said compressed off-gas supplied to said combustion means to a temperature greater than the gas dew point of the off-gas. The off-gas heating means is useful for ensuring that no liquids are formed in the fuel gas supply to the combustor.

In one aspect, a method is provided for reducing or eliminating condensation of off-gas supplied to a turbine power generation system, which comprisesheating off-gas supplied to a combustion means of a turbine power generation system to a temperature greater than the gas dew point of the off-gas, using heat generated by the turbine power generation turbine power generation system or using heat generated by compression of the off-gas for supply to said combustion means.

In another aspect, a method of generating power from an off-gas fuel source is provided which comprises compressing a quantity of air using a first compression means; compressing a quantity of off-gas using a second compression means; heating said compressed off-gas to a temperature greater than the gas dew point of the off-gas using a heating means; combusting a mixture of said compressed air and said heated compressed off-gas using a combustion means; converting energy released from said combustion into mechanical energy with a turbine means; and converting the mechanical energy produced by said turbine means into electrical energy with a transduction means, said mechanical energy produced by said turbine means also being utilized by said first compression means.

DETAILED DESCRIPTION

Apparatus and methods have been developed for use in conditioning off-gas fuels used in turbine power generation systems, particularly microturbines, to ensure that no liquids are formed in the fuel gas supply to the combustor. The term "microturbine" generally refers to combustion turbines with an output of between 25 and 1000 kW.

As used herein, the term "off-gas" or "off-gas fuel" refers to essentially any fuel gas that potentially can form liquids due to the compression process or due to ambient conditions. This includes essentially any high-BTU or low- to medium-BTU fuel gas that is a waste gas or by-product gas from another industrial or biological process. The off-gas typically contains one or more light (C1–C4) hydrocarbons (e.g., methane, propane, n-butane) and may also contain lesser amounts of C5–C7 hydrocarbons (e.g., n-pentane, hexane, heptane). The off-gas typically comprises at least between 20 and 80% methane. Examples of sources of such off-gases include, but are not limited to, oil or natural gas production facilities, landfills, waste water treatment facilities, digesters that convert animal waste (e.g., from cow, pig, duck) into a combustible gas, and coal bed methane (i.e. natural gas that can be found in coal beds). In one embodiment, the off-gas is a bio-based fuel, which typically is corrosive, relatively high in moisture content, and has a relatively low BTU value. The off-gas fuel may also be combined with other fuel gases, such as methane, propane, or other natural or synthetic gases, from non-off-gas sources. For example, commercially supplied natural gas or propane gas may be used to start-up the combustor or to supplement the fuel requirements of the combustor.

Figure 1:
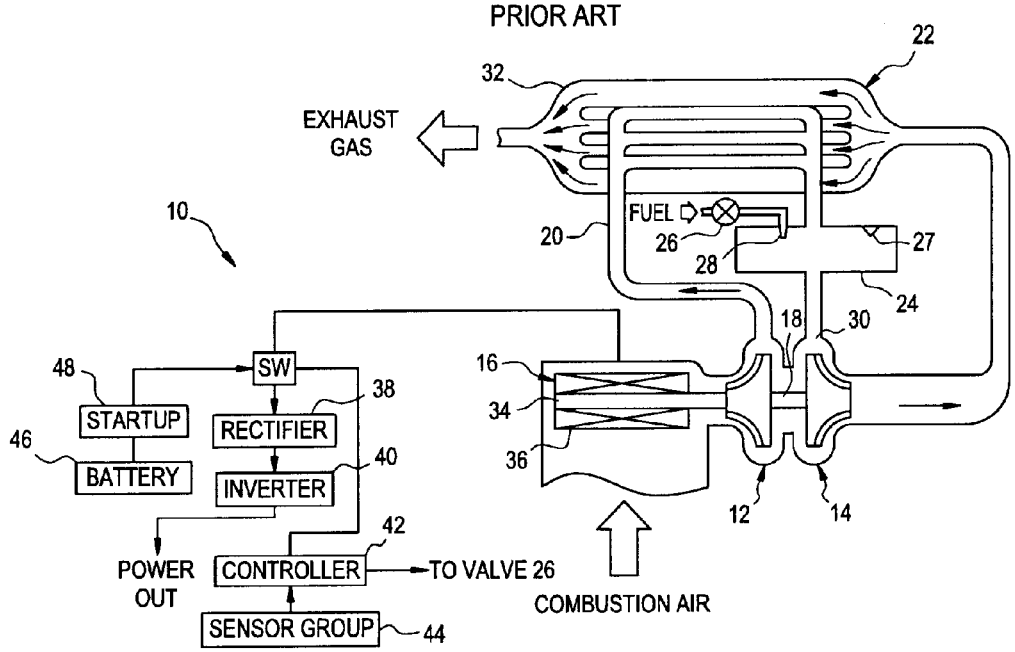
FIG. 1 is a process flow diagram of a prior art turbine power generating system, which can be adapted for use with an off-gas fuel source.

FIG. 1 illustrates a prior art example of a turbine power generating system 10, which can be adapted to use as off-gas fuel as described herein. The turbine power generating system 10 includes an air compressor 12, a turbine 14, and an electrical generator 16. The electrical generator 16 is cantilevered from the air compressor 12. The compressor 12, the turbine 14, and the electrical generator 16 can be rotated by a single shaft 18. Although the air compressor 12, turbine 14, and electrical generator 16 can be mounted to separate shafts, the use of a single common shaft 18 for rotating the air compressor 12, the turbine 14, and the electrical generator 16 adds to the compactness and reliability of the power generating system 10. The shaft 18 typically is supported by self-pressurized air bearings such as foil bearings.

Air entering an inlet of the air compressor 12 is compressed. Compressed air leaving an outlet of the air compressor 12 is circulated through cold side passages 20 in a cold side of a recuperator 22. In the recuperator 22, the compressed air absorbs heat, which enhances combustion. The heated, compressed air leaving the cold side of the recuperator 22 is supplied to a combustor 24.

Fuel is also supplied to the combustor 24. The flow of fuel is controlled by a flow control valve 26. The fuel is injected into the combustor 24 by an injection nozzle 28. The fuel comprises an off-gas as defined above and is supplied as described below.

Inside the combustor 24, the fuel and compressed air are mixed and ignited by an igniter 27 in an exothermic reaction. The combustor 24 can be any type of premix combustion system, including, but not limited to, catalytic combustors. In one embodiment, the combustor 24 contains a suitable catalyst capable of combusting the compressed, high temperature, fuel-air mixture at the process conditions. Representative examples of catalysts usable in the combustor 24 include platinum, palladium, as well as metal oxide catalyst with active nickel and cobalt elements.

After combustion, hot, expanding gases resulting from the combustion are directed to an inlet nozzle 30 of the turbine 14. The inlet nozzle 30 has a fixed geometry. The hot, expanding gases resulting from the combustion is expanded through the turbine 14, thereby creating turbine power. The turbine power, in turn, drives the air compressor 12 and the electrical generator 16.

Turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the gas exits the recuperator 22. Additional heat recovery stages could be added onto the power generating system 10.

The generator 16 can be a ring-wound, two-pole toothless (TPTL) brushless permanent magnet machine having a permanent magnet rotor 34 and stator windings 36. The turbine power generated by the rotating turbine 14 is used to rotate the rotor 34. The rotor 34 is attached to the shaft 18. When the rotor 34 is rotated by the turbine power, an alternating current is induced in the stator windings 36. Speed of the turbine can be varied in accordance with external energy demands placed on the system 10. Variations in the turbine speed will produce a variation in the frequency of the alternating current (i.e., wild frequencies) generated by the electrical generator 16. Regardless of the frequency of the ac power generated by the electrical generator 16, the ac power can be rectified to dc power by a rectifier 38, and then chopped by a solid-state electronic inverter 40 to produce ac power having a fixed frequency. Accordingly, when less power is required, the turbine speed can be reduced without affecting the frequency of the ac output.

Use of the rectifier 38 and the inverter 40 allows for wide flexibility in determining the electric utility service to be provided by the power generating system of the present invention. Because any inverter 40 can be selected, frequency of the ac power can be selected by the consumer. If there is a direct use for ac power at wild frequencies, the rectifier 38 and inverter 40 can be eliminated.

The power generating system 10 can also include a battery 46 for providing additional storage and backup power. When used in combination with the inverter 40, the combination can provide uninterruptible power for hours after generator failure. Additionally, the controller causes the battery 46 to supply a load when a load increase is demanded. The battery 46 can be sized to handle peak load demand on the system 10.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier 38 and the inverter 40 can also be placed in the air stream. After the air has absorbed heat from the aforementioned sources, it is compressed in the compressor 12 and further pre-heated in the recuperator 22.

A controller 42 controls the turbine speed by controlling the amount of fuel flowing to the combustor 24. The controller 42 uses sensor signals generated by a sensor group 44 to determine the external demands upon the power generating system 10. The sensor group 44 could include sensors such as position sensors, turbine speed sensors and various temperature and pressure sensors for measuring operating temperatures and pressures in the system 10. Using the aforementioned sensors, the controller 42 controls both startup and optimal performance during steady state operation. The controller 42 can also determine the state of direct current storage in the battery 46, and adjust operations to maintain conditions of net charge, net drain, and constant charge of the battery.

A switch/starter control 48 can be provided off-skid to start the power generating system 10. Rotation of the compressor 12 can be started by using the generator 16 as a motor. During startup, the switch/starter control 48 supplies an excitation current to the stator windings 36 of the electrical generator 16. Startup power is supplied by the battery 46. In the alternative, a compressed air device could be used to motor the power generating system 10.

Figure 2:
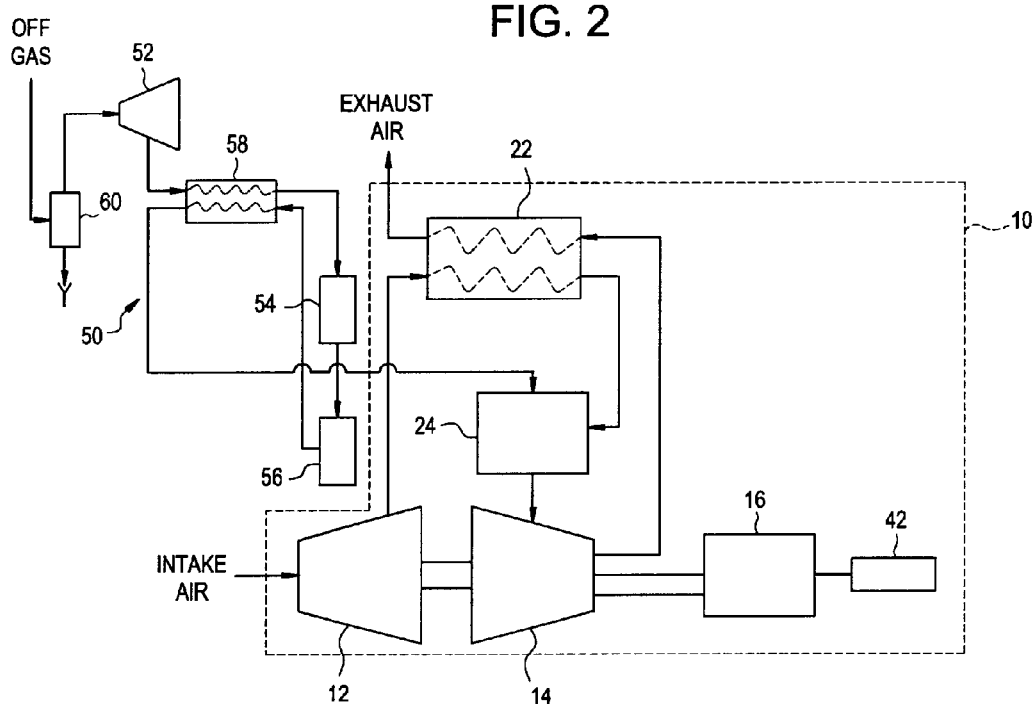
FIG. 2 is a process flow diagram of an embodiment of a turbine power generating system comprising a system for heating cooled off-gas fuel using heat from the compression of the off-gas.

FIG. 2 illustrates the power generation system 10 operably connected to off-gas conditioning sub-system 50. The off-gas conditioning sub-system 50 includes an off-gas compressor 52 to increase the pressure of the off-gas from its low supply pressure to a pressure suitable for delivery to the combustor 24. The off-gas compressor can be, for example, a sliding vane (i.e. rotary) compressor, a reciprocating compressor, or a rotary screw compressor. The sub-system further includes an off-gas cooler 54, to cool the compressed off-gas, and a mix tank 56, where a supplemental or start-up fuel gas can be mixed with the off-gas. The off-gas cooler 54 can be, for example, an air-cooled heat exchanger or a cooling water cooled heat exchanger. In addition, condensed components in the off-gas are separated from the off-gas in the mix tank 56, and can be drained through a drain (not shown) in the mix tank 56. The primary functions of the mix tank 56 are to provide a location to collect and drain any liquids that form and to serve as a point to inject a starter fuel if necessary.

The off-gas conditioning sub-system 50 also includes an off-gas heater 58 for reheating the cooled off-gas that is discharged from the mix tank 56. The off-gas heater 58 includes a gas-to-gas heat exchanger, such as a shell and tube heat exchanger, having a hot side flow path and a cold side flow path adjacent and thermally coupled to the hot side flow path. The off-gas discharged from compressor 52 flows through the hot side flow path to cool the off-gas to a first temperature and then flows through off-gas cooler 54 where the off-gas is cooled to a second temperature that is lower than the first temperature. The off-gas from the mix tank 56 then flows through the cold side flow path of the gas-to-gas heat exchanger of the off-gas heater 58, thereby reheating the off-gas to a temperature at least greater than the gas dew point of the off-gas, to ensure that no liquids are formed in the fuel gas supply to the combustor 24. Optionally, the off-gas can be passed through a scrubber 60 before being fed to the inlet of the off-gas compressor, for example to separate liquids or solid particulate matter entrained in the off-gas.

The values that follow are provided as an example. Off-gas is compressed in a single stage rotary compressor 52 to between 5.9 and 6.9 bars (85 and 100 psig). (It should be noted that multi-stage compressors also could be used, with any liquid formed during the interstage cooling process being removed prior to entering the next compression stage.) The compressed off-gas leaving the cold side of the off-gas heater 58 is between 40 and 65° C. (100 and 150° F.). The pressure drop between the fuel gas compressor discharge and the inlet of the microturbine typically would be less than 3% of the compressor discharge, e.g., a pressure drop of 1.25% each for the off-gas cooler and the off-gas heater, and 0.5% for the mixing tank. The temperature of the fuel gas discharged from the fuel gas compressor would be approximately 200° C. (400° F.). The off-gas cooler discharge temperature and the mixing tank temperature should be approximately ambient.

Figure 3:
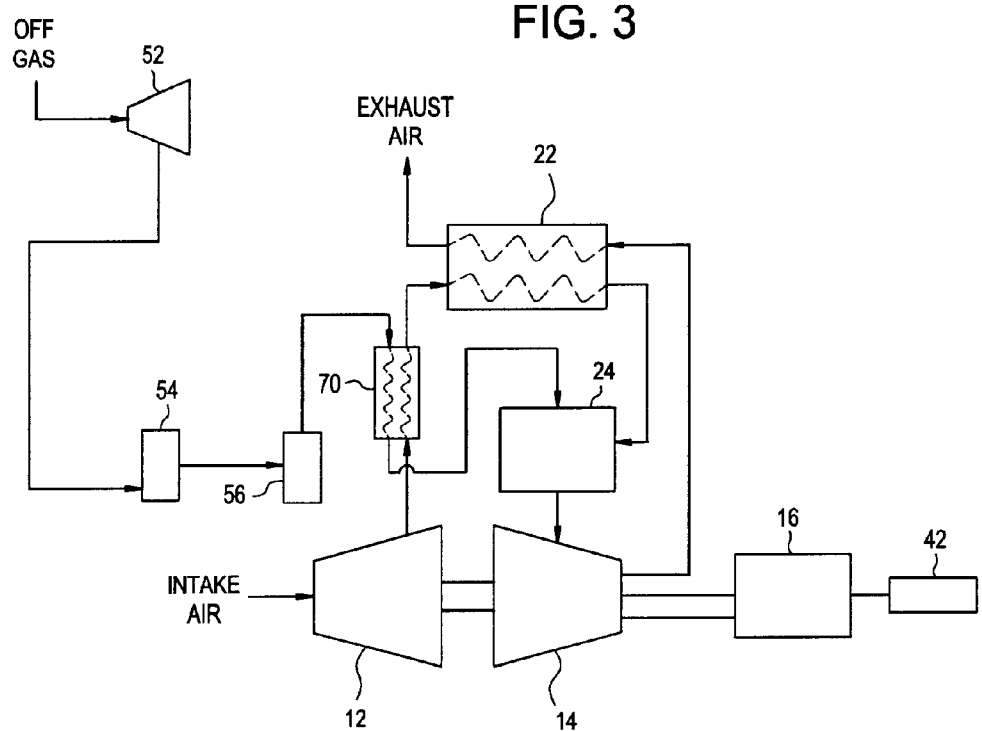
FIG. 3 is a process flow diagram of an embodiment of a turbine power generating system comprising a system for heating off-gas fuel using heat from the compression of the combustion air.
Figure 4:
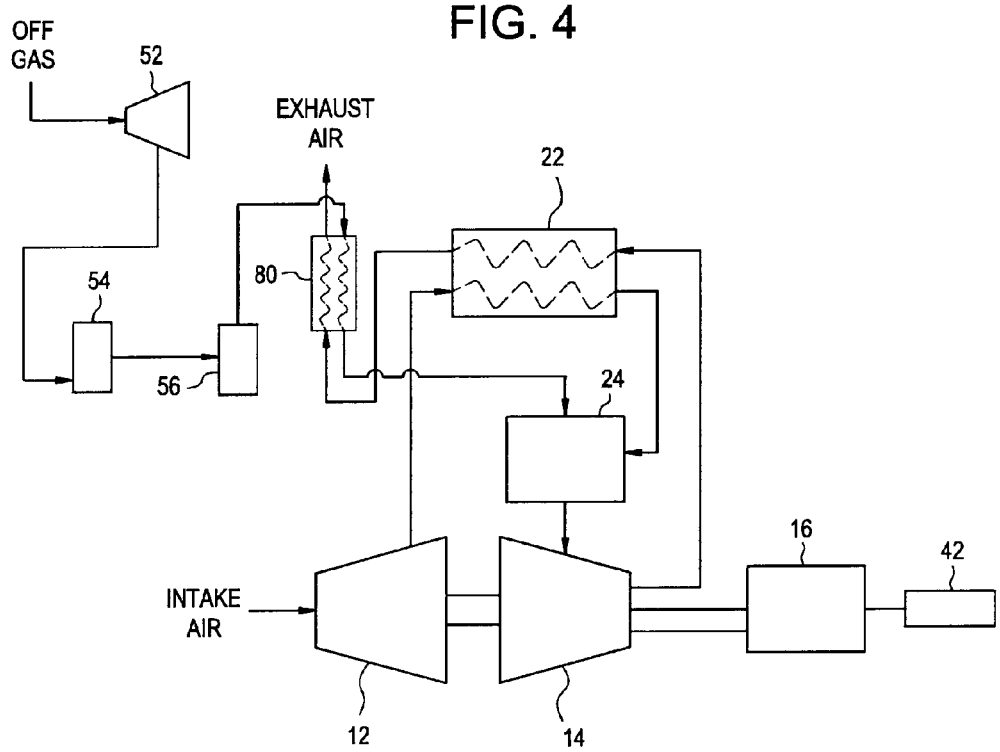
FIG. 4 is a process flow diagram of an embodiment of a turbine power generating system comprising a system for heating cooled off-gas fuel using heat from the exhaust air.

In alternative embodiments, the off-gas heater is adapted to extract heat from other process gases flowing in the system. For example, the heat could be from the compressed combustion air, e.g., between the discharge of the air compressor 12 and the inlet of the combustor 24, or from the exhaust air, e.g., after the discharge of the turbine 14, before or after the recuperator 22. FIG. 3 illustrates an embodiment in which an off-gas heater 10 transfers heat to the off-gas from the compressed air flowing between the discharge of the compressor 12 and the combustion air inlet of the recuperator 22. FIG. 4 illustrates an embodiment in which an off-gas heater 80 transfers heat to the off-gas from the exhaust air discharged from the recuperator 22. Off-gas heater 70 and off gas heater 80 each can be a gas-to-gas heat exchanger, such as of a shell and tube design.

Figure 5:
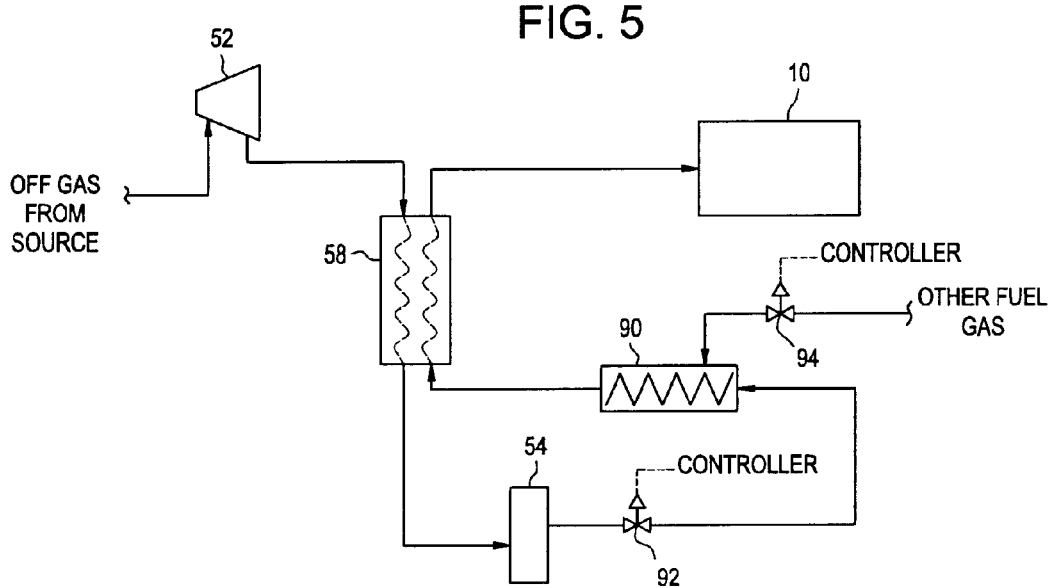
FIG. 5 is a process flow diagram of an off-gas supply system which comprises means for mixing the off-gas with another fuel gas and means for heating this fuel mixture for supply to a turbine power generating system.

FIG. 5 shows another embodiment of an off-gas supply and conditioning system for a turbine power generation system. The off-gas is compressed by compressor 52 and passes through off-gas heater 58 (hot side) and then through off-gas cooler 54. The off-gas then flows into mixing device 90 where it can be mixed with another fuel gas, which supplements the off-gas as needed. An example of a suitable mixing device is a static mixer, as known in the art. Control valves 92 and 94 can be used to control the ratio of off-gas to other fuel gas, as well as controlling the total flow of the gas mixture to the combustor. The gas mixture then flows from mixing device 90 and through off-gas heater 58 (cold side) and to turbine power generation system 10.

The power generating system 10 operates on a conventional recuperated Brayton cycle. The Brayton cycle can be operated on a relatively low pressure ratio (e.g., 3.8 bars) to maximize overall efficiency; since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. This high temperature heat addition results in an increased overall cycle efficiency.

The values that follow are provided as an example. Air is compressed in a single stage radial compressor 12 to 3.8 bars. The compressed air can be directed to the recuperator 22 where the temperature of the compressed air is increased using the waste heat from the turbine exhaust gas. The temperature of the exhaust gas from the turbine is limited to about 700° C. (1,300° F.), in order to help extend the life of the recuperator 22. For exhaust gas temperatures above 700° C. (1,300° F.), the recuperator 22 can be made of super alloys instead of stainless steel. The recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 12,500 kJ/kWh (11,900 BTU/kWh) on diesel.

After being heated in the recuperator 22, the compressed air is directed to the combustor 24, where additional heat is added to raise the temperature of the compressed air to 900° C. (1,650° F.). A combustor 24 designed according to a conventional design can yield a $NO_x$ level of less than 25 ppm, and a combustor 24 using a catalyst can yield a $NO_x$ rate that is virtually undetectable (commercial $NO_x$ sensors are limited to a 2 to 3 ppm detection range). The high enthalpic gas is then expanded through the turbine 14. The impeller, the turbine wheel, the rotor, and the tieshaftthe moving parts in the engine corespin as a single unit at high speeds of approximately 60,000 rpm or more. The resulting generator output frequency of around 1,200 Hz is then reduced by the inverter 40 to a grid-compatible 50 or 60 cycles. Resulting is a high power density typified by low weight (about a third of the size of a comparable diesel generator) and a small footprint (for example, approximately 0.9 m by 1.5 m by 1.8 m high). The high power density and low weight of the technology is made possible through the high speed components which permits large amounts of power using a minimum of material.

Potential applications for the power generating system 10 are many and diverse. Applications include use in off-grid applications for standalone power, on-grid applications for peak shaving, load following or base load service, emergency back-up and uninterruptible power supply, prime mover applications (e.g., pump, air conditioning) and automotive hybrid vehicles.

The invention is not limited to the specific embodiments disclosed above. For example, the present invention could be configured without the electrical generator 16. Turbine power would be transmitted and applied directly, as in the case of a mechanically driven refrigeration system.

Modifications and variations of the methods and devices described herein will be obvious to those skilled in the art from the foregoing detailed description. Such modifications and variations are intended to come within the scope of the appended claims.

I claim:

1. A method for reducing or eliminating condensation of off-gas supplied to a turbine power generation system, comprising:
   heating off-gas supplied to a combustion means of a turbine power generation system to a temperature greater than the gas dew point of the off-gas, using heat generated by the turbine power generation system or using heat generated by compression of the off-gas for supply to said combustion means.

2. The method of claim 1, wherein said off-gas heating is achieved using heat generated by compression of the off-gas for supply to said combustion means.

3. The method of claim 2, wherein off-gas is compressed, flows through a hot side flow path of a gas-to-gas heat exchanger in which the off-gas is cooled to a first temperature, flows through an off-gas cooling means in which the off-gas is cooled to a second temperature that is lower than the first temperature, and then flows through a cold side flow path of said gas-to-gas heat exchanger to achieve said off-gas heating, said cold side flow path being adjacent and thermally coupled to said hot side flow path.

4. The method of claim 1, wherein the turbine power generation system comprises a turbine means which discharges exhaust gases, and wherein heat is transferred from said exhaust gases to the off-gas to achieve said off-gas heating.

5. The method of claim 1, wherein the turbine power generation system comprises an air compression means which discharges compressed air, and wherein heat is transferred from said compressed air to the off-gas to achieve said off-gas heating.

6. The method of claim 1, wherein the off-gas supplied to the turbine power generation system is a waste gas or by-product gas from a source selected from a landfill, a wastewater treatment process, a digester, and an oil or natural gas production facility.

7. A method of generating power from an off-gas fuel source comprising:
   compressing a quantity of air using a first compression means;
   compressing a quantity of off-gas using a second compression means;
   heating said compressed off-gas to a temperature greater than the gas dew point of the off-gas using a heating means;
   combusting a mixture of said compressed air and said heated compressed off-gas using a combustion means;
   converting energy released from said combustion into mechanical energy with a turbine means; and
   converting the mechanical energy produced by said turbine means into electrical energy with a transduction means, said mechanical energy produced by said turbine means also being utilized by said first compression means.

8. The method of claim 7, wherein said compressed off-gas flows through a hot side flow path of a gas-to-gas heat exchanger to cool the off-gas to a first temperature, flows through an off-gas cooling means to cool the off-gas to a second temperature that is lower than the first temperature, and then flows through a cold side flow path of said gas-to-gas heat exchanger to achieve said off-gas heating said cold side flow path being adjacent and thermally coupled to said hot side flow path.

9. The method of claim 7, wherein said heating of the compressed off-gas is conducting by transferring heat from exhaust gases, which flow from said turbine means, to the off-gas.

10. The method of claim 7, wherein said heating of the compressed off-gas is conducting by transferring heat from said compressed air, which flows from the first compressor means, to the off-gas.

11. The method of claim 3, further comprising mixing said cooled off-gas with another fuel gas to form a fuel gas mixture which flows through the cold side flow path of the heat exchanger.

12. The method of claim 1, wherein said turbine power generation system is a microturbine power generation system.

13. The method of claim 7, wherein said quantity of off-gas comprises a waste gas or by-product gas from a source selected from a landfill, a wastewater treatment process, a digester, and an oil or natural gas production facility.

14. The method of claim 7, wherein said turbine means comprises a microturbine.

* * * * *